(12) United States Patent
Williams et al.

(10) Patent No.: US 11,354,126 B2
(45) Date of Patent: Jun. 7, 2022

(54) DATA PROCESSING

(71) Applicant: Arm Limited, Cambridge (GB)

(72) Inventors: Michael John Williams, Cambridge (GB); Nigel John Stephens, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/975,486

(22) PCT Filed: Feb. 15, 2019

(86) PCT No.: PCT/GB2019/050408
§ 371 (c)(1),
(2) Date: Aug. 25, 2020

(87) PCT Pub. No.: WO2019/166772
PCT Pub. Date: Sep. 6, 2019

(65) Prior Publication Data
US 2021/0034362 A1    Feb. 4, 2021

(30) Foreign Application Priority Data
Feb. 28, 2018 (GB) .................... 1803250

(51) Int. Cl.
*G06F 9/30* (2018.01)
(52) U.S. Cl.
CPC ...... *G06F 9/30036* (2013.01); *G06F 9/30145* (2013.01)
(58) Field of Classification Search
CPC ................. G06F 9/30036; G06F 9/30145
See application file for complete search history.

(56) References Cited

U.S. PATENT DOCUMENTS

| 9,348,595 B1 * | 5/2016 | Mizrahi ............. G06F 9/3838 |
| 2004/0064685 A1 | 1/2004 | Nguyen et al. |
| 2013/0283020 A1 | 10/2013 | Ehrlich et al. |

(Continued)

FOREIGN PATENT DOCUMENTS

| EP | 1 267 258 | 12/2002 |
| WO | 2014/147446 | 9/2014 |
| WO | WO-2017021269 A1 * | 2/2017 ......... G06F 9/30076 |

OTHER PUBLICATIONS

International Search Report and Written Opinion of the ISA for PCT/GB2019/050408, dated May 7, 2019, 14 pages.

(Continued)

*Primary Examiner* — Zachary K Huson
(74) *Attorney, Agent, or Firm* — Nixon & Vanderhye P.C.

(57) ABSTRACT

Data processing apparatus comprises vector processing circuitry to selectively apply vector processing operations defined by vector processing instructions to generate one or more data elements of a data vector comprising a plurality of data elements at respective data element positions of the data vector, according to the state of respective predicate flags associated with the positions of the data vector; and generator circuitry to generate instruction sample data indicative of processing activities of the vector processing circuitry for selected ones of the vector processing instructions, instruction sample data indicating at least the state of the predicate flags at execution of the selected vector processing instructions.

18 Claims, 16 Drawing Sheets

(56) References Cited

U.S. PATENT DOCUMENTS

| | | |
|---|---|---|
| 2015/0089190 A1 | 3/2015 | Gonion |
| 2015/0242210 A1 | 8/2015 | Kim et al. |
| 2016/0188334 A1* | 6/2016 | Lee .................... G06F 9/30036 712/7 |
| 2016/0196140 A1 | 7/2016 | Dayan et al. |

OTHER PUBLICATIONS

Combined Search and Examination Report for GB1803250.8, dated Aug. 24, 2018, 7 pages.
Robert Bedichek, "Some Efficient Architecture Simulation Techniques," Proceedings of the Winter 1990 USENIX Conference, Jan. 22-26, 1990, 12 pages.

* cited by examiner

FIG. 13

256-bit vector, 4×64-bit elements

*All 64-bit elements active*

FIG. 14

256-bit vector, 4×64-bit elements

*COUNT = 32 : "Some Inactive" and "All Inactive" flags are not set and sample is optionally suppressed*

FIG. 15

256-bit vector, 8×32-bit elements

COUNT = 32 : "Some Inactive" and "All Inactive" flags are not set and sample is optionally suppressed

FIG. 16

256-bit vector, 8×32-bit elements

COUNT = 0 : "Some Inactive" and "All Inactive" flags are both set and sample is optionally suppressed

FIG. 17

256-bit vector, 8×32-bit elements

COUNT = 16 : "Some Inactive" flag set and "All Inactive" flags not set - sample is not suppressed

FIG. 18

256-bit vector, 4×64-bit elements

COUNT = 32 : "Some Inactive" and "All Inactive" flags are not set and sample is optionally suppressed FIG. 19 — 256-bit vector, 32×8-bit elements COUNT = 15 : "Some Inactive" flag set and "All Inactive" flags not set - sample is not suppressed FIG. 20 — 256-bit vector, 16×16-bit elements COUNT = 14 : "Some Inactive" flag set and "All Inactive" flag not set - sample is not suppressed

FIG. 21

256-bit vector, 8×32-bit elements

COUNT = 16 : "Some Inactive" flag set and "All Inactive" flags not set - sample is not suppressed

FIG. 22

256-bit vector, 4×64-bit elements

COUNT = 32 : "Some Inactive" and "All Inactive" flags are not set and sample is optionally suppressed

128-bit vector, 8×16-bit elements

| | 255 | 224 | 223 | 192 | 191 | 160 | 159 | 128 | 127 | 96 | 95 | 64 | 63 | 32 | 31 | 0 |
|---|---|---|---|---|---|---|---|---|---|---|---|---|---|---|---|---|
| V: | X | X | X | X | X | X | X | X | X | X | [5] | [4] | [3] | X | X | [0] |
| P: | 1 | 0 | 1 | 1 | 0 | 0 | 0 | 1 | 0 | 0 | 1 | 1 | 1 | 0 | 0 | 1 |
| | 31 | 28 | 27 | 24 | 23 | 20 | 19 | 16 | 15 | 12 | 11 | 8 | 7 | 4 | 3 | 0 |
| S: | 0 | 0 | 0 | 0 | 0 | 0 | 0 | 0 | 0 | 0 | 1 | 1 | 1 | 0 | 0 | 1 |

COUNT = 8 ; "Some Inactive" flag set and "All Inactive" flag not set - sample is not suppressed, leading-zeroes might be compressed

FIG. 27

Simulator Implementation

DATA PROCESSING

This application is the U.S. national phase of International Application No. PCT/GB2019/050408 filed 15 Feb. 2019, which designated the U.S. and claims priority to GB Patent Application No. 1803250.8 filed 28 Feb. 2018, the entire contents of each of which are hereby incorporated by reference.

BACKGROUND

This disclosure relates to data processing apparatus and methods.

Some data processing arrangements allow for vector processing operations, involving applying a single vector processing instruction to data items of a data vector having a plurality of data items at respective positions in the data vector. By contrast, scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

SUMMARY

In an example arrangement there is provided a data processing apparatus comprising:

vector processing circuitry to selectively apply vector processing operations defined by vector processing instructions to generate one or more data elements of a data vector comprising a plurality of data elements at respective data element positions of the data vector, according to the state of respective predicate flags associated with the positions of the data vector; and generator circuitry to generate instruction sample data indicative of processing activities of the vector processing circuitry for selected ones of the vector processing instructions, instruction sample data indicating at least the state of the predicate flags at execution of the selected vector processing instructions.

In another example arrangement there is provided a vector processing method comprising:

selectively applying vector processing operations defined by vector processing instructions to generate one or more data elements of a data vector comprising a plurality of data elements at respective data element positions of the data vector, according to the state of respective predicate flags associated with the positions of the data vector; and generating instruction sample data indicative of vector processing activities for selected ones of the vector processing instructions, instruction sample data indicating at least the state of the predicate flags at execution of the selected vector processing instructions.

In another example arrangement there is provided a computer program for controlling a host data processing apparatus to provide an vector instruction execution environment comprising:

vector processing program logic to selectively apply vector processing operations defined by vector processing instructions to generate one or more data elements of a data vector comprising a plurality of data elements at respective data element positions of the data vector, according to the state of respective predicate flags associated with the positions of the data vector; and generator program logic to generate instruction sample data indicative of processing activities of the vector processing circuitry for selected ones of the vector processing instructions, instruction sample data indicating at least the state of the predicate flags at execution of the selected vector processing instructions.

Further respective aspects and features of the disclosure are defined by the appended claims.

BRIEF DESCRIPTION OF THE DRAWINGS

The present technique will be described further, by way of example only, with reference to embodiments thereof as illustrated in the accompanying drawings, in which:

FIGS. 9 to 22 provide schematic examples of the generation of instruction sample data;

FIG. 27 provides a schematic example of the generation of instruction sample data;

DESCRIPTION OF EMBODIMENTS

Figure 1:
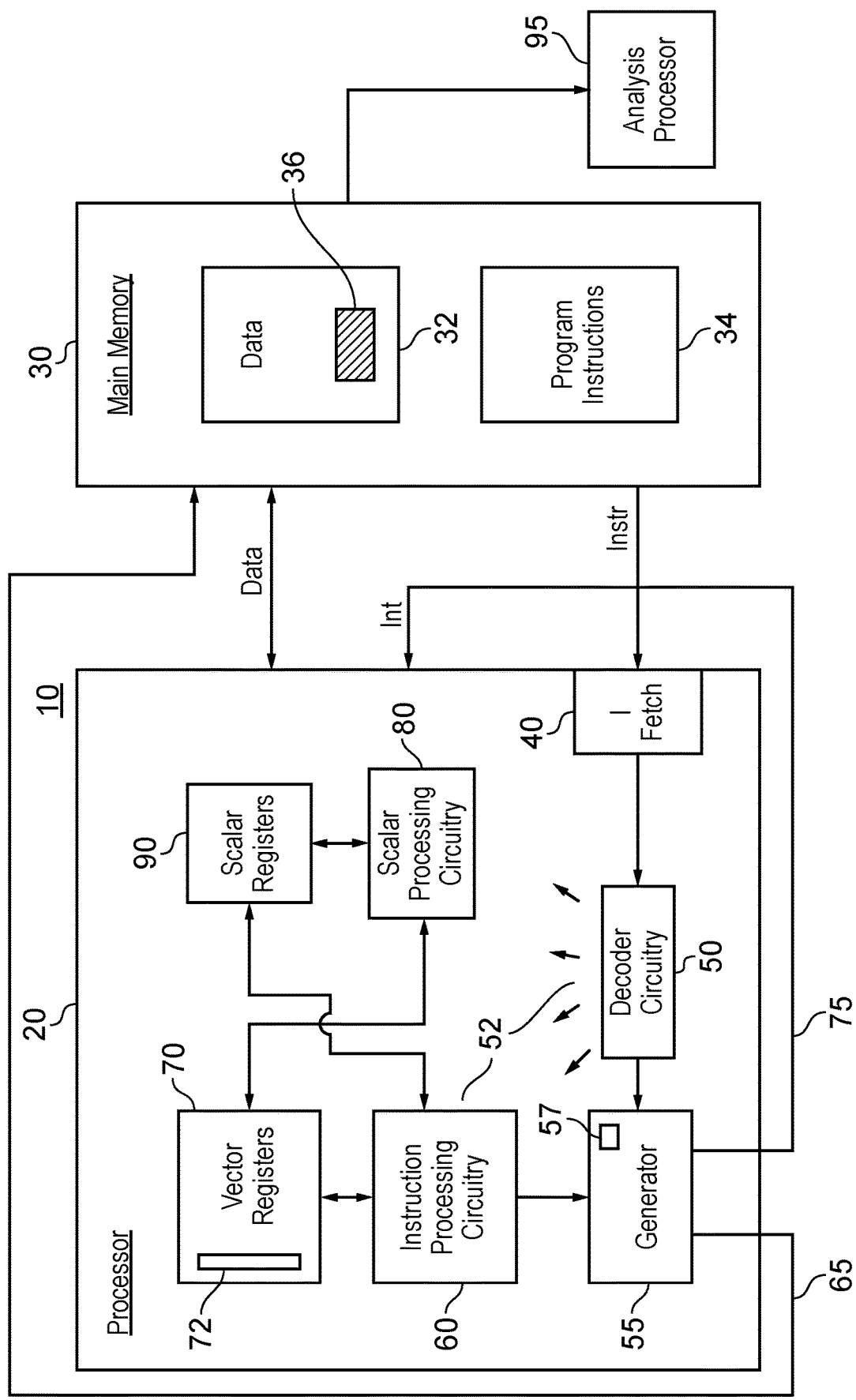
FIG. 1 schematically illustrates a data processing apparatus.

Referring now to the drawings, FIG. 1 schematically illustrates a data processing system 10 comprising a processor 20 coupled to a memory 30 storing data values 32 and program instructions 34. The processor 20 includes an instruction fetch unit 40 for fetching program instructions 34 from the memory 30 and supplying the fetch program instructions to decoder circuitry 50. Vector processing circuitry 52 comprises decoder circuitry 50 and instruction processing circuitry 60. The decoder circuitry 50 decodes the fetched program instructions and generates control signals to control the instruction processing circuitry 60 to perform vector processing operations upon vector registers stored within vector register circuitry 70 as specified by the decoded vector instructions.

The processor 20 also comprises scalar processing circuitry 80 associated with scalar registers 90.

A general distinction between scalar processing and vector processing is as follows. Vector processing involves applying a single vector processing instruction to data items of a data vector having a plurality of data items at respective positions in the data vector. Scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

The discussion below relates to example program instructions 34. Embodiments of the present disclosure include an apparatus, for example of the type shown in FIG. 1, operable or configured to decode and execute such program instructions. FIG. 1 therefore provides an example of vector processing circuitry to selectively apply vector processing operations defined by vector processing instructions to generate one or more data elements of a data vector comprising a plurality of data elements at respective data element positions of the data vector, according to the state of respective predicate flags associated with the positions of the data vector. The predicate flags are stored in a register file 72, forming one of the set of vector registers 70.

A generator 55 is associated with the decoder circuitry 50 and the instruction processing circuitry 60. The generator 55 carries out a sampling process so as to generate instruction sample data 65 indicative of the operations of at least the instruction processing circuitry 60. The term sampling relates to the fact that the data 65 is not generated for every instruction executed by the instruction processing circuitry 60 (as might be the case in the generation of so-called trace data) but rather a sample of instructions is selected by the generator 55 and potentially detailed information acquired as the instruction sample data about the selected instructions.

The ratio of sampled instructions to total instructions executed is a matter of a design choice, but typically the ratio might be of the order of one in a thousand to one in several hundreds of thousands of instructions which are sampled. It can be useful for the ratio to be such that the process of generating the instruction sample data for a particular executed instruction can be completed by the time that the next instruction is sampled, so that there is no need to handle an ongoing pipeline of sample data. The sampling can be regular, for example every nth instruction (where n is perhaps 10000), which can be referred to as so-called systematic sampling of the instructions. However, to alleviate possible resonance effects whereby a regularity in the executed code (such as a loop) might mean that sampling every n instructions does not give a range of different circumstances being sampled, a random or pseudo-random contribution to the sampling interval can be used. Techniques to achieve this will be discussed further below.

The generator 55 writes the instruction sample data to main memory, for example to a reserved or otherwise allocated region 36 of memory. In doing so, the generator 55 maintains a count (for example, using a counter 57) of the amount of data written to the region 36. When the region reaches a threshold level of occupancy (such as 95% or even 100%) with the instruction sample data, the generator issues an interrupt 75 to the processor 20 to cause the processor to: (i) output the instruction sample data from the region 36 to an analysis processor 95 such as a general purpose computer running appropriate analysis software, and (ii) reset the counter 57.

The instruction sample data can relate to many different aspects of the operation of the processor 20. In the present examples, it relates at least in part to the state of the predicate flags at execution of a sampled instruction. This feature will be discussed in more detail below. The generator 55 therefore provides an example of generator circuitry to generate instruction sample data indicative of processing activities of the vector processing circuitry for selected ones of the vector processing instructions, instruction sample data indicating at least the state of the predicate flags at execution of the selected vector processing instructions.

The storage of instruction sample data associated with the state of the predicate flags can be useful in the performance monitoring, debugging and other analysis of vector processing circuitry. To achieve a useful gain in efficiency over scalar processing, it is appropriate for the vectorised or parallel nature of the processing to be utilised. If a significant number of predicate flags are set to inactive in respect of the sampled instructions, this can indicate that the system is not efficiently using the parallel vector processing available to it and/or is potentially wasting power by running a vectorised system that is not being appropriately utilised, and so this can potentially prompt further investigation or diagnosis, or potentially a reversion to using scalar processing for the processing task under consideration.

Therefore in these examples the vector processing circuitry comprises: instruction decoder circuitry 50 to decode program instructions; and instruction processing circuitry 60 to execute instructions decoded by the instruction decoder circuitry in dependence upon the predicate flags.

Figure 2:
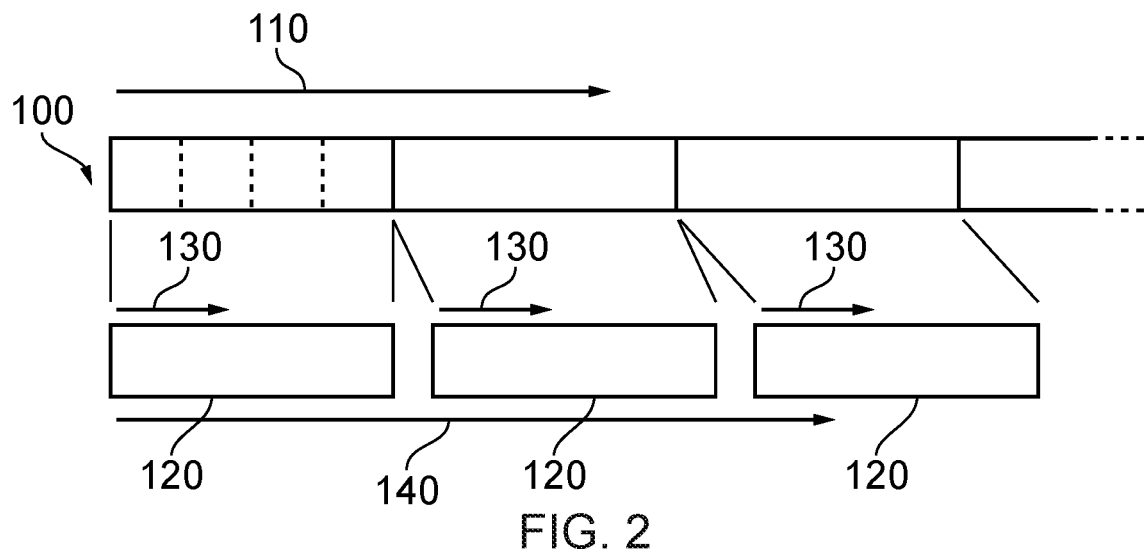
FIG. 2 schematically illustrates the handling of data as multiple data vectors.

FIG. 2 schematically illustrates the handling of data as multiple data vectors. In this arrangement, a set of data items 100 are intended to be processed in a processing order 110. The data items 100 are in fact handled as successive data vectors 120 so that in a vector processing operation, a single vector processing instruction is applied to all of the data items in the data vector (for example, 4 data items, 8 data items or whatever the prevailing vector length VL of the particular system is) simultaneously.

Having said this, each data vector 120 can retain a data item processing order 130, and from vector to vector there can be a vector processing order 140, so that if any reference is needed during processing to the original processing order 110, this can be achieved by considering the data vectors in the vector processing order 140 and considering data items within each data vector in the data item processing order 130.

Figure 3:
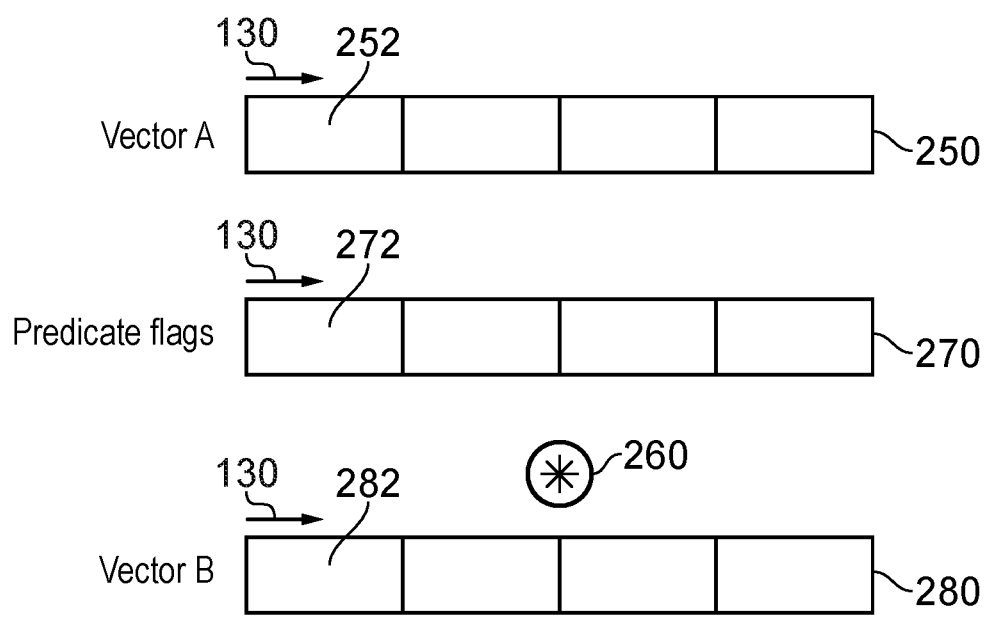
FIG. 3 schematically illustrates the use of predicate flags.

FIG. 3 schematically illustrates the use of predicate flags to control vector processing operations.

There can be instances where a single vector processing operation should be applied differently to different data items within a data vector. The instruction processing circuitry 60 provides for this by the use of predicate flags. Predicate flags comprise flag information provided for each data item position within a data vector to indicate whether a processing operation should be carried out in respect of that data item position. In examples, the instruction processing circuitry 60 can access multiple sets of predicate flags, such that any particular vector processing operation can refer to one or more sets of predicate flags as parameters to that vector processing operation.

Referring to FIG. 3, an example arrangement uses data vectors comprising four data items (VL=4) but it will be appreciated that these arrangements can apply to different vector lengths. An example input data vector 250 (Vector A) is to be the subject of a vector processing operation 260 such that, in the absence of any control by predicate flags, the vector processing operation 260 would be applied to each data item position. However, a set of predicate flags 270, one for each data item position or "lane", is also provided to control the vector processing operation.

The data items 252 of the input vector (vector A) are processed according to the vector processing operation 260 to generate data items 282 of an output data vector 280 (vector B). If the predicate flag 272 corresponding to a data item position in the output data vector 280 is set to "active" (for example, a value of 1). If the corresponding predicate flag for an output vector position is set to "inactive" (for example, a value of 0) then the vector processing operation 260 in respect of that output vector position is not carried out.

As discussed above, in the present examples the predicate flags control whether a vector processing operation for a particular output position or "lane" in relation to the output data vector 280 is carried out. However, in other examples, predicate flags could be used to control whether data item positions in the input vector (or one or more input vectors) 250 are used. In the present examples, however, the predicate flags indicate whether processing is active or inactive at each data element position, a data element being generated by the vector processing operations at a data element position at which processing is active.

This therefore provides an example of the predicate flags having an active state indicating that the vector processing instruction should be applied to those positions of a data vector corresponding to predicate flags in the active state. An inactive state indicates that the vector processing operation should not be so applied.

If a vector processing operation is not carried out in respect of a particular output vector position 282, because of an inactive predicate flag, then in some examples a fixed value such as 0 can be inserted into that output position. In other examples the previous contents, whatever they are, of that output position can be left unchanged.

The use of predicate flags in this manner therefore provides an example of applying a vector processing instruction to one or more data items of a data vector comprising a plurality of data items at respective positions in the data vector, according to the state of respective predicate flags associated with the positions.

Figure 4:
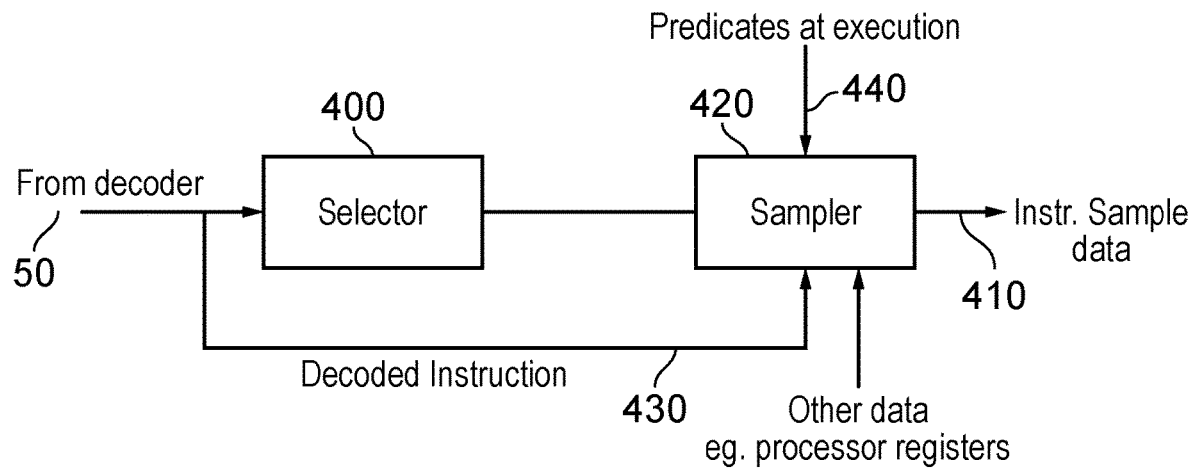
FIG. 4 schematically illustrates a part of the operation of a generator.

FIG. 4 is a schematic diagram illustrating some of the functionality of the generator 55. A selector 400 selects an instruction on which a sampling process should be performed so as to generate instruction sample data 410. In some examples to be discussed in more detail below, the selector 400 achieves this by counting decoded instructions from the decoder 50 and sampling, for example, every nth instruction where n is perhaps of the order of 1000 or 10000.

In connection with a sampled instruction, the selector 400 instructs a sampler 420 to generate the instruction sample data 410 indicative of the execution of that instruction. The sampler 420 can be provided as inputs with the decoded instruction 430 itself (for example in order to detect an instruction type and optionally a word length associated with the instruction, a feature which will be discussed in connection with FIG. 7 below), the predicate flags 440 applicable at the time of execution of the sampled instruction and optionally other data relating to the execution of the instruction such as values in processor registers or the like.

In these examples, therefore, the generator circuitry is responsive to decoding of a selected instruction by the instruction decoder circuitry 50 to initiate generation of the instruction sample data, and is responsive to the instruction processing circuitry to generate the instruction sample data indicating the state of the predicate flags at the time of execution of the selected instruction.

From these data, the sampler 420 prepares instruction sample data 410 associated with the sampled instruction.

A schematic example of instruction sample data comprises the following example fields:
- an indication of the instruction type
- an indication of a word or element length set by the instruction
- an indication of the vector length applicable at execution of the instruction
- an indication of the contents of various processor registers at execution of the instruction
- an indication of the predicate flags applicable at the time of execution of the instruction (for example, a count value and/or event data to be discussed below, and/or a copy of the set of predicate flags)

Figure 5:
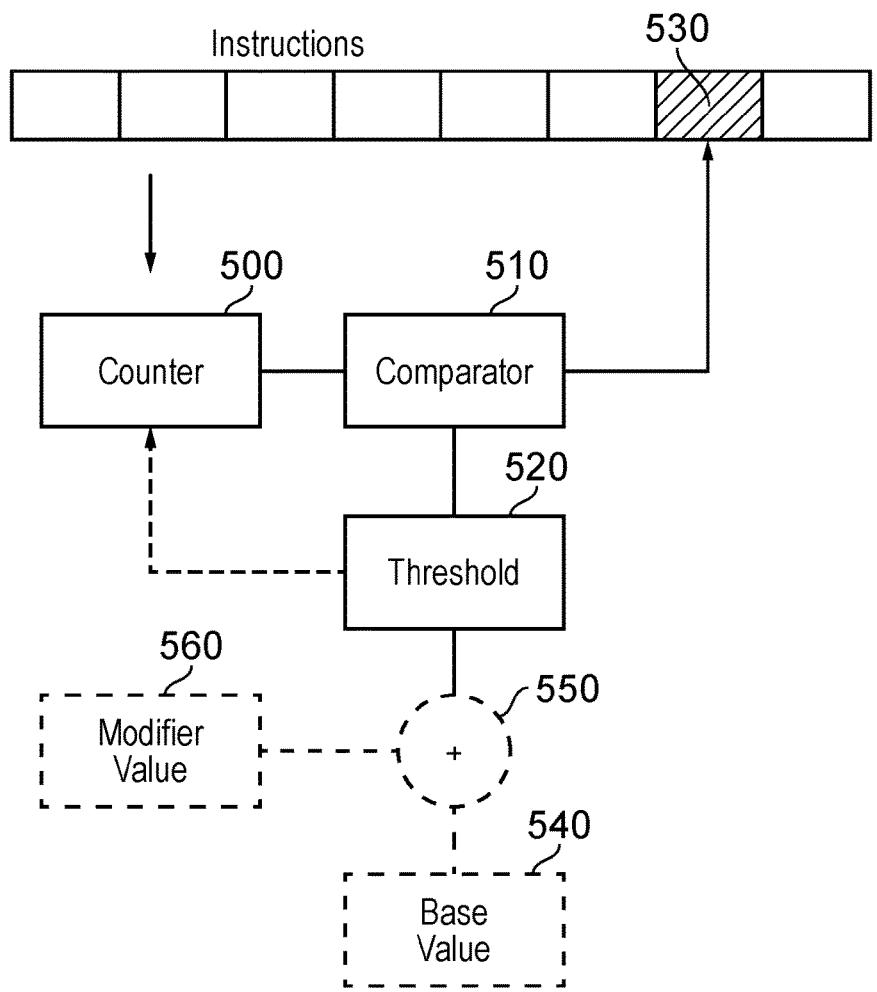
FIG. 5 schematically illustrates a selection operation.

FIG. 5 schematically illustrates an example of the operation of the selector 400. A counter 500 counts successive instructions received from the decoder 50. The count may be, for example, an upwards count (for example from zero) or a downwards count (for example to zero). More generally, the count is from a start count value to a final count value. As an example involving an upward count, a comparator 510 compares the current count value with a threshold value 520 (representative of the final count value) and when the count value reaches the threshold value, an associated instruction at that count position, such as an instruction 530, is selected for sampling.

Optionally, the threshold 520 can be derived from a base value 540 added by an adder or other combiner 550 with a modifier value 560 such as a random or pseudo-random value, for example applicable to a particular number of least significant bits (LSBs) of the base value. The randomised or pseudo-randomised threshold can be applied as the start count value or the final count value depending on which way the counting is progressing.

Therefore, in these examples, instruction selection circuitry (embodied by the selector 400) to select the selected (sampled) ones of the instructions comprises counter circuitry is configured to count instructions between a start count value and a final count value, and to select, as a selected instruction, an instruction for which the counter reaches the final count value. Optionally, the instruction selection circuitry can be configured to combine one or both of the start count value and the final count value with a modifier value, such as a random or pseudorandom number.

Figure 6:
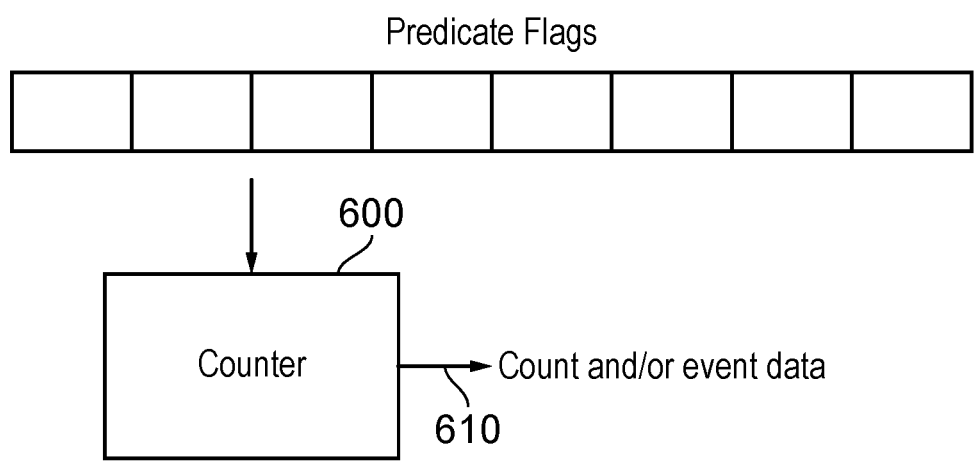
FIGS. 6 and 7 schematically illustrate a part of a sampling operation.

FIG. 6 schematically illustrates one aspect of the operation of the sampler 420, involving a counter operation 600 which counts the number of predicate flags indicative of active processing in the respective vector lane. The output of the counter 610 can be, for example, a count such as 8, 12, 14 . . . to indicate a number of the predicate flags indicating that processing is active and/or so-called event data such as flag indicating either that no predicate flags were set or a flag indicating that all available predicate flags were set, or in other words to selectively indicate at least one of: all predicate flags indicate that processing is active; at least some predicate flags indicate that processing is inactive; and all predicate flags indicate that processing is inactive. The use of event data in this way allows a potentially lower data quantity to be used for the instruction sample data while still providing potentially useful information about the state of the predicate flags.

Figure 7:
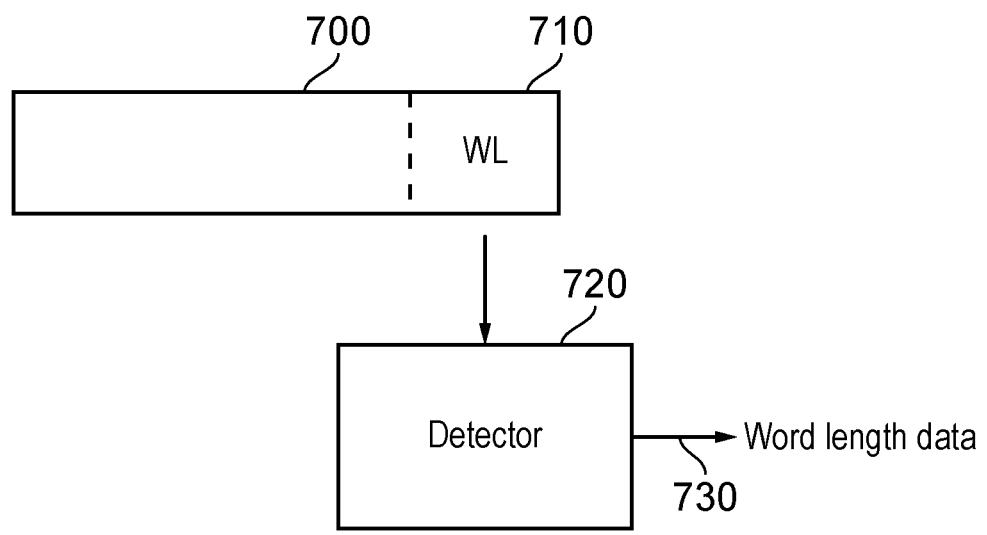

FIG. 7 schematically illustrates another potential aspect of the operation of the sampler 420, in that, for an instruction opcode 700 which specifies a data element or word length 710 as part of the opcode, a detector 720 generates, as at least a part of the instruction sample data 410, data 730 indicative of the word length applicable to the current sampled instruction.

Therefore, in these examples, at least some of the vector processing instructions are configured to define a data element size from a set of candidate data element sizes, and in which the instruction sample data for a given vector processing instruction indicates a data element size applicable to execution of the given vector processing instruction. For example, although an instruction could set a data element size for subsequent instructions, for at least some of the vector processing instructions, the data element size applicable to execution of that instruction is defined by at least a part of that vector processing instruction.

Figure 8:
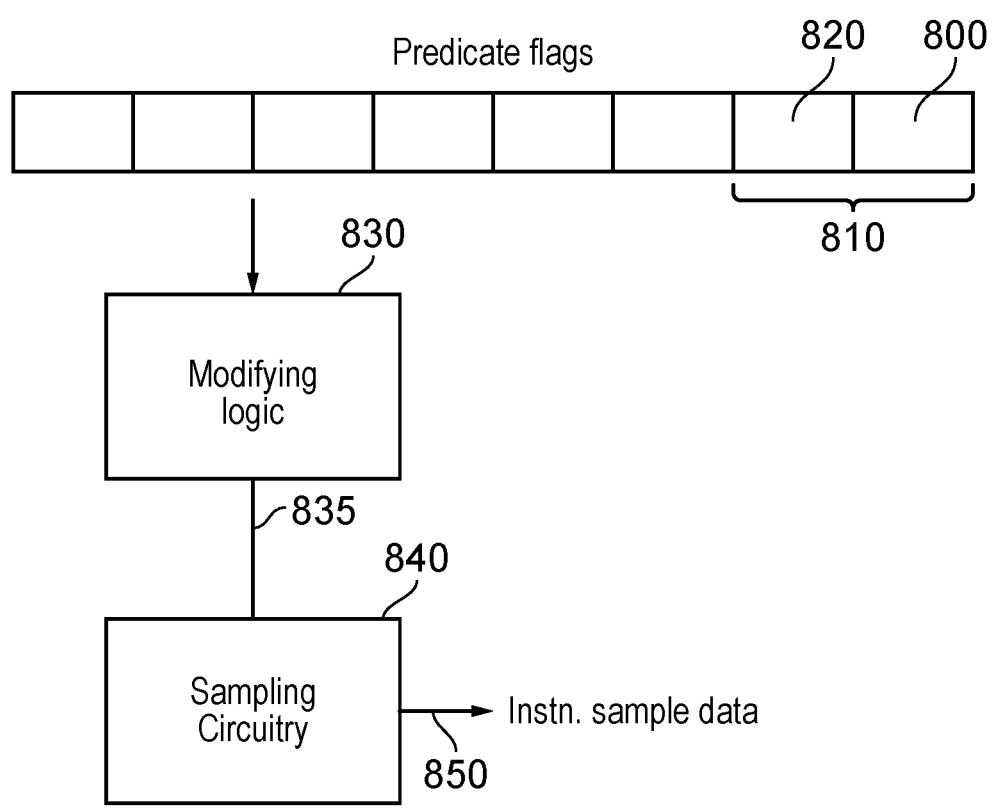
FIG. 8 schematically illustrates the use of modifying logic.

FIG. 8 schematically illustrates a feature of the predicate flags which may apply in the context of a system having a variable word length.

As an example, within the range of variable word lengths, it is appropriate to provide a single predicate flag at least for each possible instance of the smallest word length. For example, in FIG. 8, a predicate flag 800 is applicable to an instance of the shortest available word length. However, if a longer word length is used, the ratio of predicate flags to vector processing lanes, for a particular vector length, may be greater than 1:1. In particular, with a longer word length, the same vector length will provide a smaller number of vector processing lanes, so that, for example, a pair 810 of predicate flags may be applicable to an individual vector processing lane at a longer word length. In other examples, a group of four or more predicate flags may be applicable to a single lane.

A convention is sometimes provided by which, of a group of predicate flags associated with a data element such as the group 810, a subset of that group, such as the predicate flag 800 (for example, the predicate flag at the least significant position applicable to that lane), is used to indicate whether processing is active or inactive at that data element position. In the example of FIG. 8, the other predicate flag 820 of the group 810 is redundant and can have an unspecified value.

In other words, for at least some data element sizes of the set of candidate data element sizes, each data element is associated with a group of predicate flags associated with data element, in which a subset of the group of predicate flags indicates active or inactive processing at that data element position. For example, the subset of predicate flags may comprise one predicate flag 800 of each group 810 of predicate flags.

The present disclosure recognises that in a sampled system in which, for example, the number of predicate flags is counted as discussed above, having predicate flags such as the predicate flag 820 with an undefined value and a redundant function could potentially lead to a generation of misleading instruction sample data.

To address this, the generator 55 optionally comprises so called modifying logic 830 which acts, for a given group of predicate flags such as the group 810, to set predicate flags (such as the redundant flag 820) other than the subset of predicate flags 800 to the same state as the state of the subset of predicate flags. Then, sampling takes place for example counting, by sampling circuitry 840 using the techniques described above to generate instruction sample data 850.

So, for example, if the predicate flag 800 of the group 810 is set to "active" then the modifying logic 830 sets the predicate flag 820 to "active".

Importantly, note that the modifying logic 830 need not (and in these examples, does not) modify the actual predicate flags referred to by the processor 20, but just the flags which are processed by the sampling circuitry 840.

Some specific examples of these arrangements will now be discussed with reference to FIGS. 9 to 22, which in each case represent a 256-bit vector (by way of example) arranged from a most significant bit at the left hand side of the drawing to a least significant bit at the right hand side of the drawing. An upper row labelled "V" represents the vectors in use and a lower row labelled "P" represents the predicate flags. A notation of "1" represents "active" and "0" represents "inactive". A value of "X" represents an undefined or indeterminate value in a redundant predicate flag position.

Figure 9:
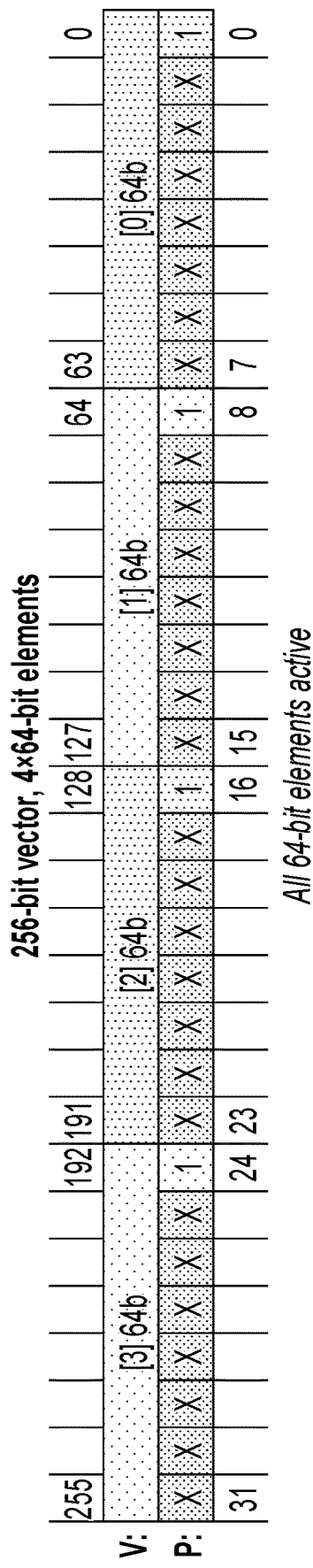
Figure 10:
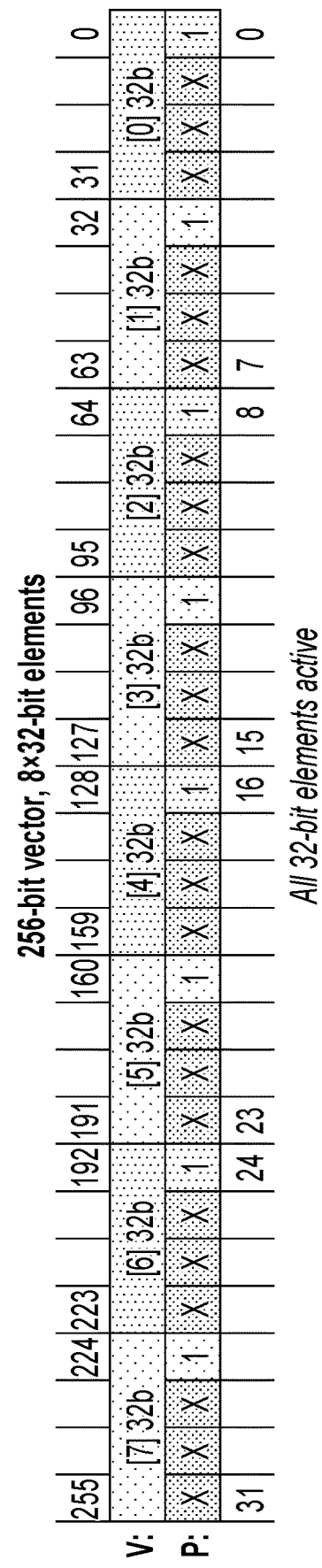

Referring to FIG. 9 an example is provided of 4×64-bit elements or words. Here, the predicate flags at positions 0, 8, 16, 24 represent the subset corresponding to the predicate flag 800 of FIG. 8. Note that 32 predicate flags are provided for the 256 bit vector because the minimum word length in this example is 8 bits. The predicate flags at positions 1 . . . 7, 9 . . . 15, 17 . . . 23 and 25 . . . 31 are undefined because they are not relevant to a determination by the instruction processing circuitry 60 as to whether the vector lane is active or inactive. In FIG. 10, an example of 8×32-bit elements is provided. Here, the predicate flags at positions 0, 4, 8, 12, 16, 20, 24, 28 represent the subset which are relevant to the determination by the instruction processing circuitry 60 as to whether that vector processing lane is active or inactive, and the remaining predicate flags are undefined.

In the examples of FIGS. 9 and 10, all of the elements are at active lane positions in the vector.

Figure 11:
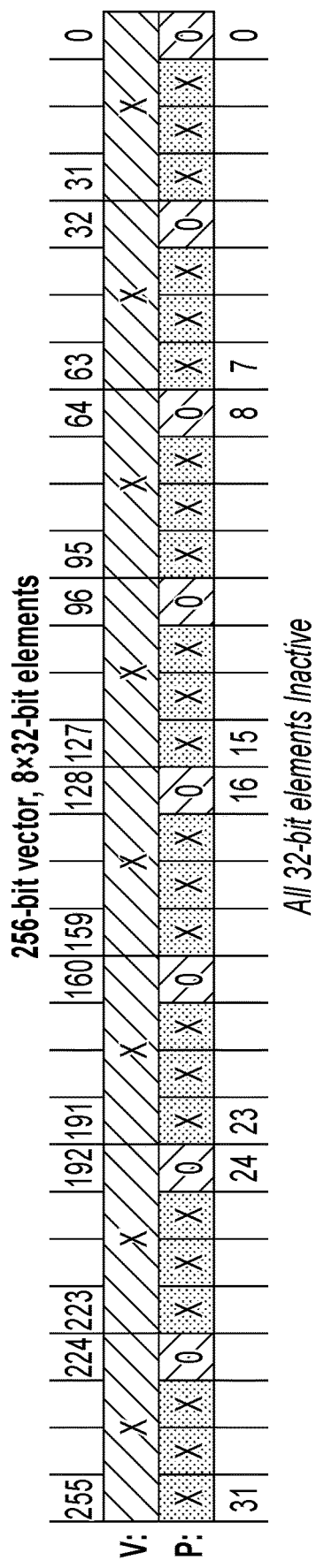

FIG. 11 shows an arrangement similar to that of FIG. 10, except that all of the vector lanes are inactive as shown by the predicate flags "0" at the subset of positions.

Figure 12:
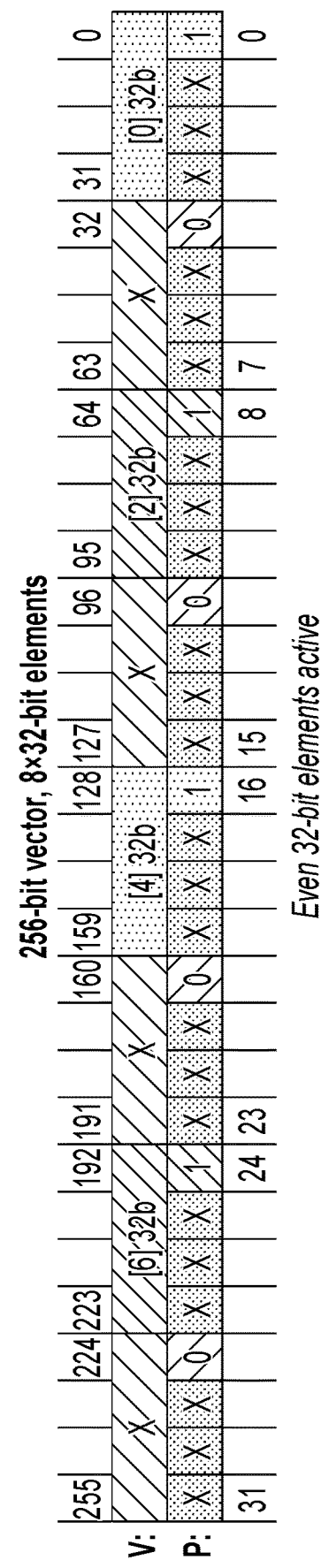

Another similar arrangement is shown in FIG. 12, in which even 32-bit elements are active and odd 32-bit elements are inactive.

FIG. 13 returns to the 4×64-bit example of FIG. 9, but using the same set of predicate flags as that of FIG. 12, although in this case because only the positions 0, 8, 16, 24 are in the subset indicative of an active or inactive status, all of the 64-bit elements are considered active.

The operation of the modifying logic will now be described further with reference to FIGS. 14 to 22. Here, a further row of values labelled as "S" represents the sampled values 835 sampled by the sampling circuitry 840 as modified by the modifying logic 830. As discussed above, the modifying logic does not need to modify the actual predicate values referred to by the processor 20, but rather modifies the way that the values that are counted.

Note that FIGS. 14 to 18 show the same vector and predicate values as FIGS. 9 to 13. Note also that FIGS. 19 to 23 show the same predicate values.

In the example of FIG. 14, the modifying logic 830 has set predicate flags other than the subset (0, 8, 16, 24) of predicate flags in a 64-bit element system to the same state of that of the subset of predicate flags, for the purposes of counting. So, for each element position or lane, the state of the predicate flag indicative of an active or inactive status for that lane is replicated across other predicate flags associated with that lane. A count value applicable to this arrangement is 32 which indicates that all predicate values were set.

A similar arrangement is shown in FIG. 15 relating to an 8×32-bit element system with all lanes active, again leading to a count of 32.

In FIG. 16, the 8×32-bit lanes are all inactive and in the data 835 output by the modifying logic 830, predicate flags other than the subset (0, 4, 8, 12, 16, 20, 24, 28) are set to the same status the respective subset of predicate flags leading to a count of zero.

FIG. 17 is an example of 8×32-bit elements in which even lanes are active and odd lanes are inactive. By applying the technique described above, the count value is 16 which indicates correctly that half of the lanes are active and half inactive.

FIG. 18 is an example of 4×64-bit elements all of which are active, with the process of the modifying logic 830 leading to a count of 32 active predicate flags.

At another extreme, FIG. 19 shows an example of 32×8-bit elements such that each predicate flag position represents an individual processing lane. In the example shown, the count is 15.

At another optional word length, FIG. 20 shows an example of 16×16-bit elements some of which that are active and some inactive, but by applying the processing of the modifying logic 830, a count of 14 is obtained indicating correctly that a proportion of 14/32 of the elements are active.

FIG. 21 relates to an 8×32-bit arrangement, once again in which the processing of the modifying logic 830 leads to a count of 16, correctly indicating that 50% of the lanes are active.

Finally, FIG. 22 is a 4×64-bit element example, in which the processing of the modifying logic 830 again leads to a count of 32, correctly indicating that all lanes are active.

Figure 23:
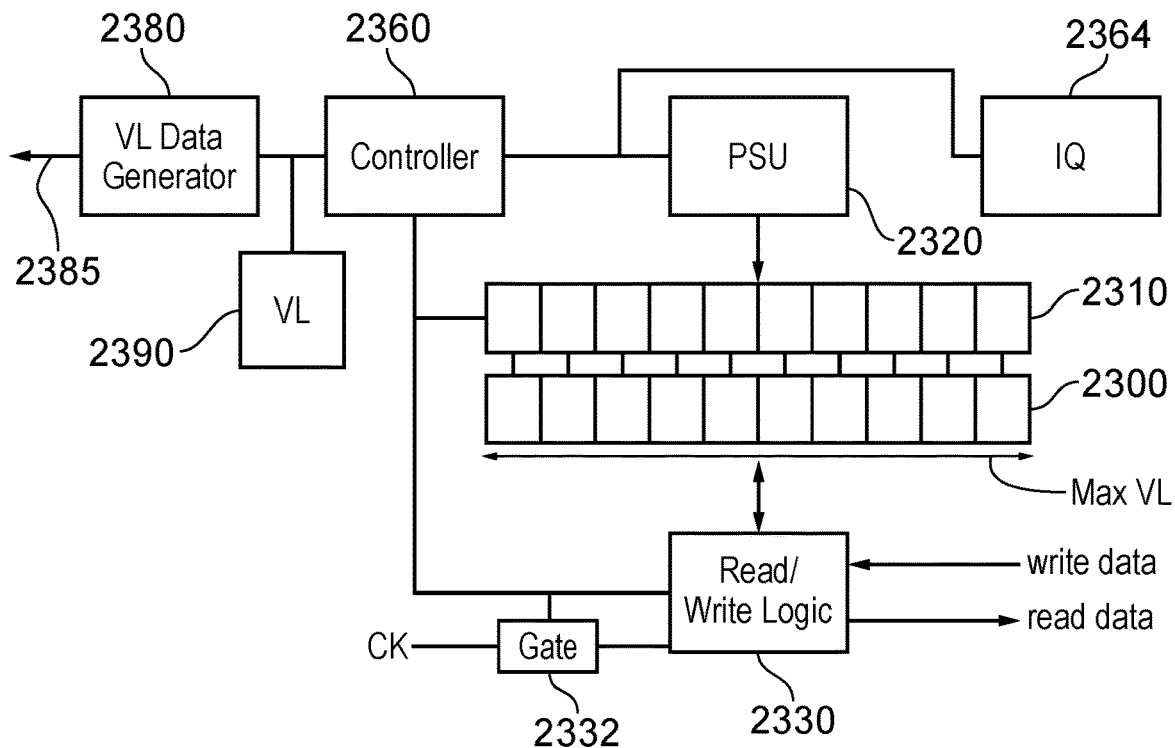
FIG. 23 schematically illustrates the use of a variable vector length.

FIG. 23 schematically illustrates control circuitry and part of the vector processor.

Vector processing is applied by carrying out the same processing operation, generally in parallel, in respect of a set or vector of data items. This arrangement can rely upon various calculation components and register storage for each of the processing lanes (one processing lane corresponding to the processing applied to one data item in a data vector). In FIG. 23, a set of registers 2300 and a set of calculation and control elements 2310 provide a simplified representation of the processing arrangements used by the vector processor. There are one register 2300 and one processing element 2310 for each processing lane (though it will be appreciated that many more components may be involved in a real implementation of a processing lane). Note also that there may be fewer processing elements than processing lanes for some vector instructions, and those vector instructions are "cracked" or split into multiple smaller instructions for example using techniques described below, and/or there may be more processing elements than processing lanes for some vector instructions, to allow for superscalar execution of those vector instructions. The total number of processing lanes shown in FIG. 23 corresponds to the maximum possible data vector length ("Max VL") of the system. This is a physical upper limit on the data vector width and represents the number of processing lanes available to the vector processor if all of them are enabled by control circuitry 2360 (that is to say, if a current subset of disabled lanes is zero). However, in the present embodiments, under the control of the control circuitry 2360 a smaller data vector width can be selectively used instead of the maximum data vector width Max VL.

It will be appreciated that in a typical system, Max VL could be much larger than that shown schematically in FIG. 23. For example, Max VL could be 256 bit, 512 bit, 1024 bit or another value. Here, for example, "256 bit" represents up to 32 8-bit elements, or up to 16 16-bit elements, or up to 4 64-bit elements. The example value of Max VL in FIG. 23 is simply for the purposes of explanation.

The control circuitry 2360 is configured to disable operation of a subset of the processing lanes so that the disabled subset of processing lanes are unavailable for use by the vector processing circuitry, in response to a current value of VL stored in a register 2390, and maintained by the control circuitry 2360 in response to execution of instructions to change VL to be discussed below. The use of the register 2390 therefore provides an example of a current vector length being defined by a processor register having a register state which is responsive to execution of a vector length defining instruction.

This selective disabling can be achieved in various ways.

In an example, the control circuitry 2360 controls the operation of a power supply unit (PSU) 2320 which supplies power to at least parts of (or all of) each of the respective processing lanes, so as to selectively remove power from the subset of (disabled) processing lanes, for example by disabling a power supply to the subset of processing lanes.

In another example, the control circuitry 2360 supplies a control signal to the subset of processing lanes so as to disable operation of the respective processing element 2310. The processing elements can include, for example, arithmetic logic units, multipliers and the like, which can be selectively disabled by disconnection form the remaining circuitry, power supply gating or clock gating (see below).

In another example, read/write logic 2330, which controls the reading from and writing to the register elements 2300, act under the control of the control circuitry 2360 so as to inhibit reading from or writing to register elements 2300 corresponding to the subset of (disabled) processing lanes. In this example, each processing lane comprises one or more data registers such as the register elements 2300, the vector processing circuitry is configured to load data from a memory (not shown in FIG. 23, but shown as the memory 30 in FIG. 1) into the data registers and to write data from the registers to the memory; and the control circuitry 2360 is configured to inhibit the vector processing circuitry from writing data to the memory from data registers corresponding to the subset of processing lanes.

In examples, the registers corresponding to currently disabled processing lanes can be entirely disabled or powered down, or their contents can be retained (either by providing power to them, or by using a non-volatile memory element for the registers 2300), though in such a way that access to those registers corresponding to currently disabled processing lanes is prevented or inhibited. This is an example of the control circuitry 2360 being configured to inhibit the vector processing circuitry from altering data values held by data registers corresponding to the subset of processing lanes, for example involving maintaining data values held by data registers corresponding to the subset of processing lanes.

In other examples, instead of (or in addition to) varying the power supply to various components as discussed above, the control circuitry 2360 can apply a so-called clock-gating process. An example is shown schematically in FIG. 23 in respect of the read/write logic 2330, but the same arrangement can be applied to other aspects of the processing lanes such as the registers 2300 and/or the processing elements 2310. A clock signal CK is processed by a clock gate 2332 before being supplied to the read/write logic (or to parts of the read/write logic applicable to disabled processing lanes). Under the control of a signal from the control circuitry 2360, the clock gate 2332 passes or blocks the clock signal CK. So, as at least a part of disabling one or more processing lanes, the clock signal CK can be blocked from one or more components relating to those processing lanes.

Disabling the subset of processing lanes can also (or instead) involve disabling (for example, by clock gating or power gating) communication circuitry such as bus drivers relating to the disabled lanes.

In further examples, the sets of processing elements and registers may include so-called permute logic arranged to conduct cross-lane operations (where the contents of a register can depend upon operations carried out with respect to the contents of one or more other registers). In examples, the permute logic operates under the control of the control circuitry 2360 so as to be inhibited from carrying out operations which do either or both of (a) deriving the contents of a currently active lane from those of one or more currently disabled lanes, and (b) deriving the contents of a currently disabled lane.

It will be appreciated that combinations of these approaches, and other similar approaches, may be used in order to carry out the functionality of disabling operation of the subset of the processing lanes. It will also be appreciated that the alteration is different to an arrangement sometimes referred to as the use of predicate flags. Predicate flags provide conditional execution relating to respective processing lanes of a vector processor. In such situations the lanes remain available for use by the vector processor. In the present arrangements, by contrast, the subset of processing lanes is disabled so as to be unavailable for use by the vector processor, the vector processor operates as though it simply has a smaller number of processing lanes than the number corresponding to the maximum data vector length. Disabled lanes in the context of the present application are not written back to memory.

Predicated lanes may be preserved as part of register write-backs. In particular, a merging vector load may only load a subset of element while preserving the remaining values originally held by the designation register. In an OoO (out of order) processor, renaming may require the move of those remaining values from the destination register prior to renaming to the newly renamed register. Examples of the present system may not make any guarantees about the content of disabled lanes.

In another example, in order to save power by not providing power to or enabling operation of un-needed structures in the case where the prevailing vector length VL is less than Max VL, the control circuitry 2360 is configured to selectively disable operation of a portion of the data structure(s) in an instruction queue 2364 in dependence upon the data vector length set by the control circuitry, for example by controlling power supply to those data structures and/or by clock-gating those data structures as discussed above.

In example embodiments, the instruction sample data for a given vector processing instruction indicates a vector length applicable to execution of the given vector processing instruction. This can be achieved by the generator comprising a VL data generator 2380 configured to generate instruction sample data 2385 indicative of the current VL applicable to execution of a sample instruction, as stored in the register 2390.

Figure 24:
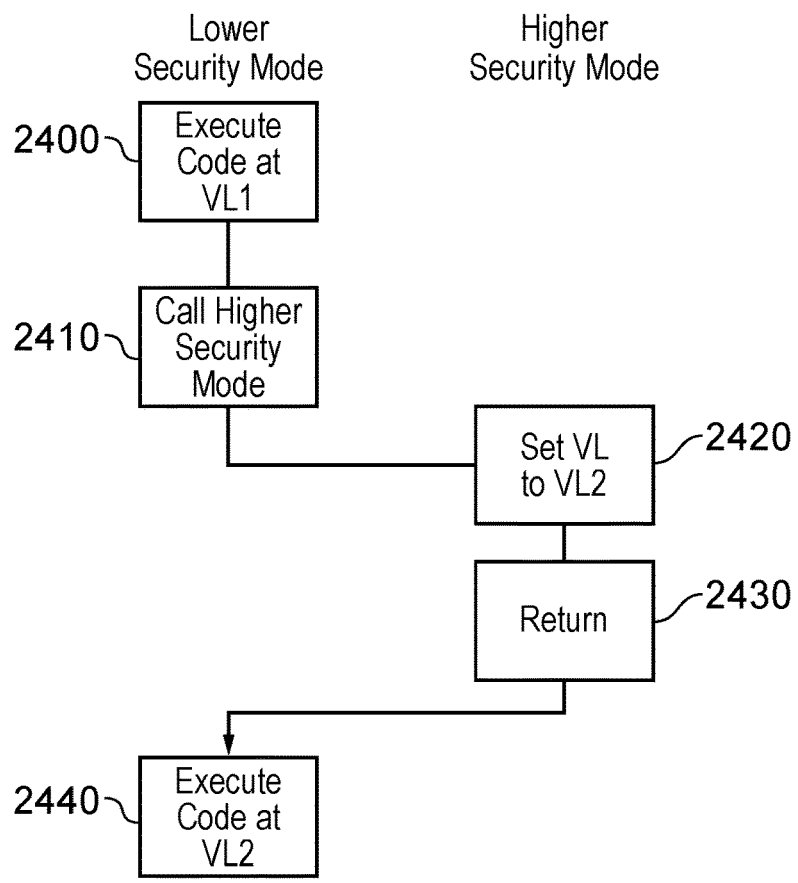
FIG. 24 is a schematic flowchart illustrating a change of vector length.

FIG. 24 is a schematic flow chart showing an example of the setting of a vector length in the register 2390 by the control circuitry 2360. In this example, the vector length for use by a lower security mode can only be set by program code operating in a higher security mode. In other examples, any instruction could be used to change VL.

The processor 20 is configured to perform processing activities in two or more security modes. The security modes can be arranged so as to inhibit a processing activity performed in one of the security modes from accessing at least some information associated with a processing activity performed in another of the security modes. For example, two or more security modes including a higher security level mode and a lower security level mode may be provided, such that operations of the processor 20 in a lower security level mode cannot access (or at least is inhibited from accessing) at least some information (such as register contents, or parts of the address space) associated with operations of the processing element in a higher security level mode. In other examples, two or more mutually exclusive security modes could be provided, so that when the processor 20 is operating in one of the two or more complementary security modes, it cannot access at least some information associated with operations in another of the two or more complementary security modes. These arrangements may be combined.

One use of different security modes of a processor is in the context of virtualisation, in which multiple operating systems co-exist on a single processor as so-called virtual machines, each under the control or oversight of a so-called hypervisor. Various steps can be taken to avoid inappropriate interference between the different virtual machines. For example, applications can run at a lowest security level; operating systems can run at a next higher security level, and the hypervisor can run at a still higher security level. In this way, protection can be built into the system to avoid (for example) an application running under one of the operating systems corrupting information used by an application running under another of the operating systems.

A temporary change in security mode can be implemented as a branch from program instructions running in one security mode to a function or subroutine under a different security mode. In order to allow registers associated with the processor to be used in the second (new) security mode without necessarily disclosing or allowing corruption of the content of those registers as used by the first (original) security mode, it can be appropriate for the processor 20 to store those registers in memory storage such as a processor stack. This also allows the processing activity in the first security mode to resume with the same register parameters that applied when the branch to the function or subroutine took place.

Referring to FIG. 24, at a step 2400, program code is executed under the lower security mode according to a data vector length VL1. At a step 2410, the program code in the lower security mode makes a call to the higher security mode. Control is transferred to the higher security mode and, at a step 2420, program code running under the higher security mode sets the vector length applicable to the lower security mode to a new vector length VL2, by executing vector length changing instruction as an example of at least some of the vector processing instructions being vector length defining instructions configured to define a vector length of the data vector. This changes the prevailing VL value in the register 2390. At a step 2430 executes a return back to the lower security mode. At a step 2440, the lower security mode executes program code at the vector length VL2.

This therefore provides an example of the apparatus being operable in a plurality of security modes such that instructions executed in a lower security mode cannot access data items accessible by instructions executed in a higher security mode, the control circuitry 2360 being responsive to decoding of a set length instruction in a current security mode to set the data vector length applicable to a lower security mode.

Note however that it is not a requirement that a vector length is set or specified in a higher security mode. There need not be any requirement to change security mode in order to make this alteration. The present techniques are concerned with detecting incorrectly or poorly chosen vector lengths irrespective of the mechanism used to set the vector length.

The process of setting a vector length VL by the control circuitry 2360 may allow for any VL value between 1 (or 2, in order for the term "vector" to apply in a useful way) up to VL Max. However, in some examples, the selectable values of VL are limited to a subset of all such available values. For example, both VL Max and a selectable value of VL may be restricted to be multiples of a particular value such as multiples of 128. As an example, if Max VL is 1024, VL can be set by the control circuitry 62 to be any one of 128, 256, 384, 512, 640, 768, 896 or 1024 bits (see the discussion above). In examples, at least some components used by the vector processor (such as registers 400, processing elements 410 and the like) can be arranged in banks of (say) 128-bit wide units, so that clock gating, power gating or other techniques can be applied on a bank-by-bank basis rather than requiring individual attention to each such element.

Note that the Set VL instruction can implement a change to an absolute value of vector length, for example "Set VL to 64". However, in the interests of providing that the Set VL instruction is itself vector length agnostic (which is to say, it will work correctly on different data processing apparatus having different physical limits or Max VL) another option is that the Set VL instruction is defined and executed so as to set the vector length to a particular proportion of Max VL, whatever Max VL is on that particular data processing apparatus. For example, the instruction could be of the form "Set VL to Max VL/4". The vector lengths VL1, VL2 in the present discussion should therefore be interpreted either as an absolute vector length or as a relative vector length expressed with reference to the Max VL of the particular executing apparatus. Note that the use of Max VL values which are powers of two, and Set VL instructions which vary VL by powers of two relative to Max VL, are useful in this context. Therefore, different versions or "flavours" of Set VL can be considered. Set VL can act according to an immediate or register-dependent operand defining a multiple of a fixed size (such as 128-bit). This can be capped at Max VL. Alternatively, Set VL can act according to an immediate or register-dependent operand describing a fraction of whatever the prevailing VL Max value is (such as 1, ½, ¼, ⅛, . . . ).

While there is not necessarily a structural limitation on how often VL can be changed, it can be appropriate for the system (under program control, for example) not to make changes more often than, say every 100 or 1000 instructions. This can help to avoid or reduce inefficiencies resulting from operations and administration (for example, changing security level, or stalling decoding as discussed below) occurring at a change of VL.

Figure 25:
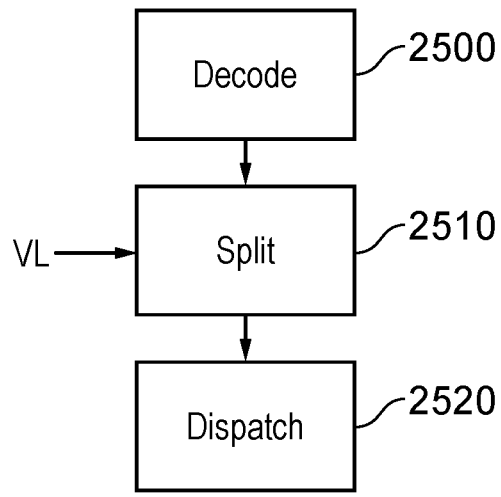
FIG. 25 is a schematic diagram illustrating instruction decoding and dispatching.

FIG. 25 schematically illustrates the operation of decoder circuitry such as the decoder circuitry 50 of FIG. 1. The flow chart of FIG. 25 is simplified for the purposes of illustrating technical points relevant to the present discussion. It will be appreciated that further operations may be performed as part of the operation of the decoding circuitry 50.

The decoder circuitry 50 is (optionally) operable to decode vector processing instructions into sets of operations, the number of sets being equal to the data vector length, which in the present embodiments is set by the control circuitry 2360. This can occur, for example, for multiple stage instructions such as scatter, gather and the like. Other operations are carried out as single vector processing instructions.

A step 2500 involves decoding a vector processing instruction. At a step 2510 the decoded instruction is split or "cracked" into sets of operations applied to data items 100 of successive data vectors 120 as discussed with reference to FIG. 2. The operation at the step 2510 is responsive to the current vector length (VL) established by the control circuitry 2360 and stored in the register 2390. At a step 2520 the sets of operations are dispatched for execution by the vector processor. The operations of the steps 2500, 2510 by the decoder circuitry 50 provide an example of an instruction decoder to decode vector processing instructions into sets of operations, the number of sets being equal to the data vector length set by the control circuitry.

Therefore the vector length applicable to a particular instruction can result from the active setting of VL, for example by a VL-setting instruction as discussed above, and/or the contents of a VL register as discussed above, and/or as a result of a cracking operation of the type discussed with reference to FIG. 25. In any one or more of these instances, the instruction sample data for a given vector processing instruction can indicate a vector length applicable to execution of the given vector processing instruction.

Also, another option in any of the scenarios just discussed is that the instruction sample data for a given vector processing instruction indicates (as well as a vector length applicable to the given instruction) a data element size applicable to the given instruction and data indicating the state of each of the predicate flags applicable to execution of the given instruction.

Figure 26:
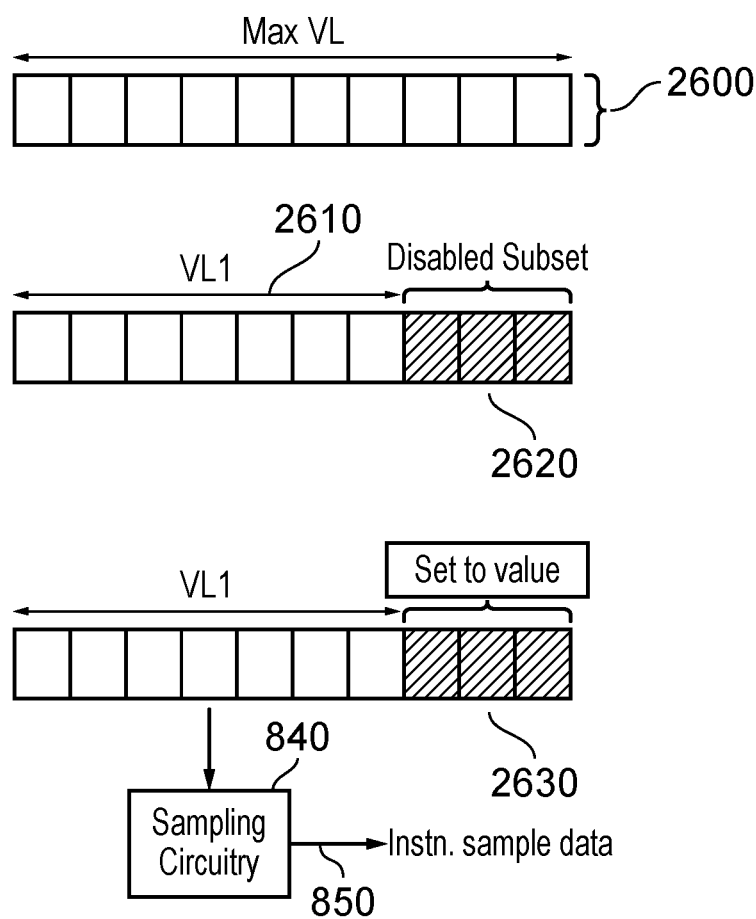
FIG. 26 schematically illustrates the use of modifying logic in the situation of a variable vector length.

FIG. 26 schematically illustrates an example of maximum vector length max VL 2600, in which the processing described above imposes a reduced vector length VL1 2610 such that a subset 2620 of processing lanes is at least temporarily disabled.

Regarding the predicate flags, the modifying logic 830 is configured to set the predicate flags 2630 corresponding to the disabled subset 2620 to a predetermined state such as "inactive", so that the sampling circuitry 840 can generate the instruction sampled data 850 based on a count of predicate flags including an inactive state for the flags 2630 corresponding to the disabled subset 2620.

An example of this is schematically illustrated in FIG. 27 which illustrates a system having a maximum vector length of 256 bits, but which is set to a current vector length of 128 bits. This means that bits 128 . . . 255 of the vector are currently disabled. However, it may be that apparently valid predicate flags are associated with the disabled vector positions. The modifying logic 830 generates the data for sampling ("S") in which vector positions 16 . . . 31 associated with the disabled lanes 128 . . . 255 are set to "inactive". This means that the count of active positions is based only on the currently enabled lanes and gives a correct value of 8.

This arrangement provides an example in which the generator circuitry is configured, for a given group of predicate flags, to generate instruction sample data which indicates that predicate flags relating to data elements not included in a vector of the current vector length are set to a predetermined state.

Figure 28:
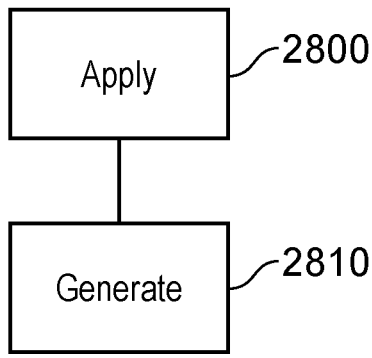
FIG. 28 is a schematic flowchart illustrating a method.

FIG. 28 is a schematic flowchart illustrating a vector processing method comprising:

selectively applying (at a step 2800) vector processing operations defined by vector processing instructions to generate one or more data elements of a data vector comprising a plurality of data elements at respective data element positions of the data vector, according to the state of respective predicate flags associated with the positions of the data vector; and generating (at a step 2810) instruction sample data indicative of vector processing activities for selected ones of the vector processing instructions, instruction sample data indicating at least the state of the predicate flags at execution of the selected vector processing instructions.

Figure 29:
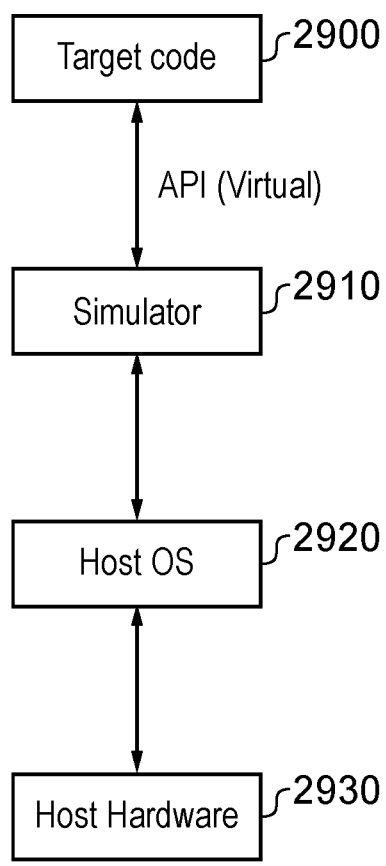
FIG. 29 schematically illustrates a virtualisation technique applicable to the present disclosure.

FIG. 29 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 2930, optionally running a host operating system 2920, supporting the simulator program 2910. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63, the contents of which are hereby incorporated by reference.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 2930), some simulated embodiments may make use of the host hardware, where suitable.

The simulator program 2910 may be stored on a computer-readable storage medium (which may be a non-transitory medium), and provides a program interface (instruction execution environment) to the target code 2900 (which may include applications, operating systems and a hypervisor) which is the same as the application program interface of the hardware architecture being modelled by the simulator program 2910. Thus, the program instructions of the target code 2900, including instructions to generate instruction sample data indicative of processing activities of the vector processing circuitry for selected ones of the vector processing instructions, instruction sample data indicating at least the state of the predicate flags at execution of the selected vector processing instructions as described above, may be executed from within the instruction execution environment using the simulator program 2910, so that a host computer 2930 which does not actually have the hardware features of the apparatus discussed above can emulate these features.

Therefore, the simulator arrangement of FIG. 29, when configured to simulate the apparatus described above, provides an example of a computer program for controlling a host data processing apparatus to provide an vector instruction execution environment comprising: vector processing program logic to selectively apply vector processing operations defined by vector processing instructions to generate one or more data elements of a data vector comprising a plurality of data elements at respective data element positions of the data vector, according to the state of respective predicate flags associated with the positions of the data vector; and generator program logic to generate instruction sample data indicative of processing activities of the vector processing circuitry for selected ones of the vector processing instructions, instruction sample data indicating at least the state of the predicate flags at execution of the selected vector processing instructions.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing apparatus comprising:
   vector processing circuitry to selectively apply vector processing operations defined by vector processing instructions to generate one or more data elements of a data vector comprising a plurality of data elements at respective data element positions of the data vector, according to the state of respective predicate flags associated with the positions of the data vector;
   generator circuitry to generate instruction sample data indicative of processing activities of the vector processing circuitry for selected ones of the vector processing instructions, instruction sample data indicating at least the state of the predicate flags at execution of the selected vector processing instructions; and
   instruction selection circuitry to select the selected ones of the vector processing instructions, in which the instruction selection circuitry comprises counter circuitry configured to count instructions between a start count value and a final count value, and to select, as a selected instruction, an instruction for which the counter reaches the final count value, wherein the instruction selection circuitry is configured to combine one or both of the start count value and the final count value with a modifier value.

2. Apparatus according to claim 1, in which the predicate flags indicate whether processing is active or inactive at each data element position, a data element being generated by the vector processing operations at a data element position at which processing is active.

3. Apparatus according to claim 1, in which the instruction sample data indicates a number of the predicate flags indicating that processing is active.

4. Apparatus according to claim 3, in which instruction sample data comprises event data to selectively indicate at least one of:
- all predicate flags indicate that processing is active;
- at least some predicate flags indicate that processing is inactive; and
- all predicate flags indicate that processing is inactive.

5. Apparatus according to claim 1, in which at least some of the vector processing instructions are configured to define a data element size from a set of candidate data element sizes, and in which the instruction sample data for a given vector processing instruction indicates a data element size applicable to execution of the given vector processing instruction.

6. Apparatus according to claim 5, in which, for at least some of the vector processing instructions, the data element size applicable to execution of that instruction is defined by at least a part of that vector processing instruction.

7. Apparatus according to claim 5, in which for at least some data element sizes of the set of candidate data element sizes, each data element is associated with a group of predicate flags associated with data element, in which a subset of the group of predicate flags indicates active or inactive processing at that data element position.

8. Apparatus according to claim 7, in which the subset of predicate flags comprises one predicate flag of each group of predicate flags.

9. Apparatus according to claim 7, in which the generator circuitry is configured, for a given group of predicate flags, to generate instruction sample data which indicates that predicate flags other than the subset of predicate flags have the same state as the state of the subset of predicate flags.

10. Apparatus according to claim 1, in which at least some of the vector processing instructions are vector length defining instructions configured to define a vector length of the data vector, and in which a current vector length is defined by a processor register having a register state which is responsive to execution of a vector length defining instruction.

11. Apparatus according to claim 1, in which the instruction sample data for a given vector processing instruction indicates a vector length applicable to execution of the given vector processing instruction.

12. Apparatus according to claim 11, in which the instruction sample data for the given vector processing instruction indicates a data element size applicable to the given instruction and data indicating the state of each of the predicate flags applicable to execution of the given instruction.

13. Apparatus according to claim 10, in which the generator circuitry is configured, for a given group of predicate flags, to generate instruction sample data which indicates that predicate flags relating to data elements not included in a vector of the current vector length are set to a predetermined state.

14. Apparatus according to claim 1, in which the vector processing circuitry comprises:
- instruction decoder circuitry to decode program instructions; and
- instruction processing circuitry to execute instructions decoded by the instruction decoder circuitry in dependence upon the predicate flags.

15. Apparatus according to claim 14, in which the generator circuitry is responsive to decoding of a selected instruction by the instruction decoder circuitry to initiate generation of the instruction sample data, and is responsive to the instruction processing circuitry to generate the instruction sample data indicating the state of the predicate flags at the time of execution of the selected instruction.

16. Apparatus according to claim 1, in which the modifier value is a random or pseudorandom number.

17. A vector processing method comprising:
- selectively applying vector processing operations defined by vector processing instructions to generate one or more data elements of a data vector comprising a plurality of data elements at respective data element positions of the data vector, according to the state of respective predicate flags associated with the positions of the data vector;
- generating instruction sample data indicative of vector processing activities for selected ones of the vector processing instructions, instruction sample data indicating at least the state of the predicate flags at execution of the selected vector processing instructions; and
- selecting the selected ones of the vector processing instructions, in which the step of selecting comprises counting instructions between a start count value and a final count value, selecting, as a selected instruction, an instruction for which the count reaches the final count value, and combining one or both of the start count value and the final count value with a modifier value.

18. A non-transitory computer-readable storage medium storing a computer program for controlling a host data processing apparatus to provide a vector instruction execution environment comprising:
- vector processing program logic to selectively apply vector processing operations defined by vector processing instructions to generate one or more data elements of a data vector comprising a plurality of data elements at respective data element positions of the data vector, according to the state of respective predicate flags associated with the positions of the data vector;
- generator program logic to generate instruction sample data indicative of processing activities of the vector processing circuitry for selected ones of the vector processing instructions, instruction sample data indicating at least the state of the predicate flags at execution of the selected vector processing instructions; and
- instruction selection logic to select the selected ones of the vector processing instructions, in which the instruction selection logic comprises counter logic configured to count instructions between a start count value and a final count value, and to select, as a selected instruction, an instruction for which the counter reaches the final count value, wherein the instruction selection logic is configured to combine one or both of the start count value and the final count value with a modifier value.

* * * * *